(12) United States Patent
Smiley et al.

(10) Patent No.: US 12,355,713 B2
(45) Date of Patent: Jul. 8, 2025

(54) METHOD AND SYSTEM FOR AUTOMATED MESSAGE GENERATION

(71) Applicant: JPMorgan Chase Bank, N.A., New York, NY (US)

(72) Inventors: Charese Smiley, Bristol, WI (US); Simerjot Kaur, Jersey City, NJ (US); Keshav Ramani, Jersey City, NJ (US); Daniel Borrajo, Pozuelo de Alarcon (ES); Steven Pomerville, Marion, NY (US); Elena Kochkina, London (GB); Toyin Aguda, Frankfort, IL (US); Mathieu Sibue, New York, NY (US); Suchetha Siddagangappa, Brooklyn, NY (US); Russell Kociuba, Rochester, NY (US); Sameena Shah, Scarsdale, NY (US); Jade Fallen, Hertfordshire (GB); Amit Aswani, Bournemouth (GB); Jonathan Roger Horn, London (GB); Samuel Angmor Mensah, Leeds (GB); Cecilia Tilli, London (GB); Pietro Totis, Martignacco (IT); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/371,251

(22) Filed: Sep. 21, 2023

(65) Prior Publication Data
US 2025/0106176 A1   Mar. 27, 2025

(51) Int. Cl.
*H04L 51/07* (2022.01)
*G06N 3/08* (2023.01)

(52) U.S. Cl.
CPC ............... *H04L 51/07* (2022.05); *G06N 3/08* (2013.01)

(58) Field of Classification Search
CPC ................................. H04L 51/07; G06N 3/08
See application file for complete search history.

(56) References Cited

U.S. PATENT DOCUMENTS

| | | | | |
|---|---|---|---|---|
| 10,616,161 B1 * | 4/2020 | Grabovitch | ............. | H04L 51/08 |
| 11,005,997 B1 * | 5/2021 | Deegan | .................... | G06F 40/35 |
| 11,138,269 B1 * | 10/2021 | Sanders | ............... | G06F 16/2468 |
| 2004/0236668 A1 * | 11/2004 | Toffey | .................... | G06Q 40/04 |
| | | | | 705/37 |

(Continued)

*Primary Examiner* — Oleg Survillo
(74) *Attorney, Agent, or Firm* — GREENBLUM & BERNSTEIN, P.L.C.

(57) ABSTRACT

A method for automating a process of generating messages that are responsive to client inquiries by using an AI algorithm that implements a machine learning technique to ensure accuracy and timeliness in the responses is provided. The method includes: receiving a first message that includes an inquiry that relates to an account associated with a user; applying an AI algorithm for analyzing the first message in order to extract information that relates to the inquiry; determining, based on a result of the analysis, whether generating a response to the inquiry requires human intervention; when human intervention is not required, retrieving information that is responsive to the inquiry from a memory; generating a second message that includes the information that is responsive to the inquiry; and transmitting the second message to the user.

18 Claims, 5 Drawing Sheets

(56) References Cited

U.S. PATENT DOCUMENTS

| | | | |
|---|---|---|---|
| 2005/0108001 A1* | 5/2005 | Aarskog | G06F 40/253 |
| | | | 704/10 |
| 2006/0212427 A1* | 9/2006 | Heidloff | G06F 16/24568 |
| 2013/0346886 A1* | 12/2013 | Cauchois | H04L 51/046 |
| | | | 715/758 |
| 2014/0184607 A1* | 7/2014 | Toyoshima | G06T 11/206 |
| | | | 345/440 |
| 2017/0324868 A1* | 11/2017 | Tamblyn | H04L 51/046 |
| 2019/0124020 A1* | 4/2019 | Bobbarjung | H04L 51/02 |
| 2021/0358473 A1* | 11/2021 | Chae | G10L 13/08 |
| 2021/0374758 A1* | 12/2021 | Hochma | G06Q 20/40145 |
| 2022/0044111 A1* | 2/2022 | Singh | G06F 40/30 |
| 2022/0108080 A1* | 4/2022 | Munavalli | G06F 40/35 |
| 2022/0147023 A1* | 5/2022 | Wang | G06F 18/24 |
| 2023/0015054 A1* | 1/2023 | Zhang | G06N 3/09 |

* cited by examiner

METHOD AND SYSTEM FOR AUTOMATED MESSAGE GENERATION

BACKGROUND

1. Field of the Disclosure

This technology generally relates to methods and systems for automated message generation, and more particularly to methods and systems for automating a process of generating messages that are responsive to client inquiries by using an artificial intelligence (AI) algorithm that implements a machine learning technique to ensure accuracy and timeliness in the responses.

2. Background Information

Many large commercial entities, including financial institutions, i.e., banks, have large numbers of clients with whom interactions occur on a regular basis. In many instances, such interactions take the form of client inquiries that may include relatively routine requests for information. Such inquiries may be transmitted in the form of an email message, a text message, a voice message, or a chat message.

In many instances, the information is available to the client via self-service on a web site of the commercial entity; however, some clients prefer not to use self-service options. In these cases, when it is required for a human being to respond to an inquiry, the process is often relatively time-consuming and expensive.

Accordingly, there is a need for a method for automating a process of generating messages that are responsive to client inquiries by using an AI algorithm that implements a machine learning technique to ensure accuracy and timeliness in the responses.

SUMMARY

The present disclosure, through one or more of its various aspects, embodiments, and/or specific features or sub-components, provides, inter alia, various systems, servers, devices, methods, media, programs, and platforms for methods and systems for automating a process of generating messages that are responsive to client inquiries by using an artificial intelligence (AI) algorithm that implements a machine learning technique to ensure accuracy and timeliness in the responses.

According to an aspect of the present disclosure, a method for automatically generating messages that are responsive to inquiries is provided. The method is implemented by at least one processor. The method includes: receiving, by the at least one processor from a user, a first message that includes an inquiry that relates to an account associated with the user; analyzing, by the at least one processor, the first message in order to extract information that relates to the inquiry; determining, by the at least one processor based on a result of the analyzing, whether generating a response to the inquiry requires human intervention; when a determination is made that the human intervention is not required, retrieving, by the at least one processor from a memory, information that is responsive to the inquiry; generating, by the at least one processor, a second message that includes the retrieved information that is responsive to the inquiry; and transmitting, by the at least one processor to the user, the second message.

The analyzing may include applying, to the first message, a first AI algorithm that is trained by using historical messages.

The analyzing may further include assigning the first message to one from among a first subset that includes unstructured text and a second subset that includes structured tables.

The analyzing may further include: identifying at least one entity that is included in the first message by using a pre-trained vector; filtering each of the identified at least one entity by using a pre-trained stoplist; and labeling each of the filtered at least one entity by using a predetermined set of entity types.

When the inquiry relates to a financial transaction, the predetermined set of entity types may include a client reference identification, a financial institution reference identification, a date, a currency amount, a volume, a Committee on Uniform Securities Identification Procedures (CUSIP) code, a Stock Exchange Daily Official List (SEDOL) code, an International Securities Identification Number (ISIN) code, and an other entity type.

The analyzing may further include extracting at least one from among an action required by the inquiry, an instrument that relates to the inquiry, a status that relates to the inquiry, and a problem that relates to the inquiry.

The determining of whether the human intervention is required may include: using a pre-trained k-means clustering model to perform a text-based clustering operation on at least one sentence included in the first message; and comparing a result of the clustering operation with a predetermined set of inquiry types in order to determine whether the human intervention is required.

The clustering operation may include: performing a Parts of Speech (POS) token tagging operation with respect to each word included in the at least one sentence; and converting the at least one sentence into a vector of numbers by using a Term Frequency-Inverse Document Frequency (TF-IDF) vectorizer.

The first message may include at least one from among an email message, a text message, a voice message, and a chat message.

According to another exemplary embodiment, a computing apparatus for automatically generating messages that are responsive to inquiries is provided. The computing apparatus includes a processor; a memory; and a communication interface coupled to each of the processor and the memory. The processor is configured to: receive, via the communication interface from a user, a first message that includes an inquiry that relates to an account associated with the user; analyze, the first message in order to extract information that relates to the inquiry; determine, based on a result of the analysis, whether generating a response to the inquiry requires human intervention; when a determination is made that the human intervention is not required, retrieve, from the memory, information that is responsive to the inquiry; generate a second message that includes the retrieved information that is responsive to the inquiry; and transmit, to the user via the communication interface, the second message.

The processor may be further configured to perform the analysis by applying, to the first message, a first AI algorithm that is trained by using historical messages.

The processor may be further configured to assign the first message to one from among a first subset that includes unstructured text and a second subset that includes structured tables.

The processor may be further configured to: identify at least one entity that is included in the first message by using a pre-trained vector; filter each of the identified at least one entity by using a pre-trained stoplist; and label each of the filtered at least one entity by using a predetermined set of entity types.

When the inquiry relates to a financial transaction, the predetermined set of entity types may include a client reference identification, a financial institution reference identification, a date, a currency amount, a volume, a Committee on Uniform Securities Identification Procedures (CUSIP) code, a Stock Exchange Daily Official List (SEDOL) code, an International Securities Identification Number (ISIN) code, and an other entity type.

The processor may be further configured to extract at least one from among an action required by the inquiry, an instrument that relates to the inquiry, a status that relates to the inquiry, and a problem that relates to the inquiry.

The processor may be further configured to determine whether the human intervention is required by: using a pre-trained k-means clustering model to perform a text-based clustering operation on at least one sentence included in the first message; and comparing a result of the clustering operation with a predetermined set of inquiry types in order to determine whether the human intervention is required.

The clustering operation may include: performing a Parts of Speech (POS) token tagging operation with respect to each word included in the at least one sentence; and converting the at least one sentence into a vector of numbers by using a Term Frequency-Inverse Document Frequency (TF-IDF) vectorizer.

The first message may include at least one from among an email message, a text message, a voice message, and a chat message.

According to yet another exemplary embodiment, a non-transitory computer readable storage medium storing instructions for automatically generating messages that are responsive to inquiries is provided. The storage medium includes executable code which, when executed by a processor, causes the processor to: receive, from a user, a first message that includes an inquiry that relates to an account associated with the user; analyze the first message in order to extract information that relates to the inquiry; determine, based on a result of the analysis, whether generating a response to the inquiry requires human intervention; when a determination is made that the human intervention is not required, retrieve, from a memory, information that is responsive to the inquiry; generate a second message that includes the retrieved information that is responsive to the inquiry; and transmit the second message to the user.

When executed by the processor, the executable code may further cause the processor to apply, to the first message, a first AI algorithm that is trained by using historical messages.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
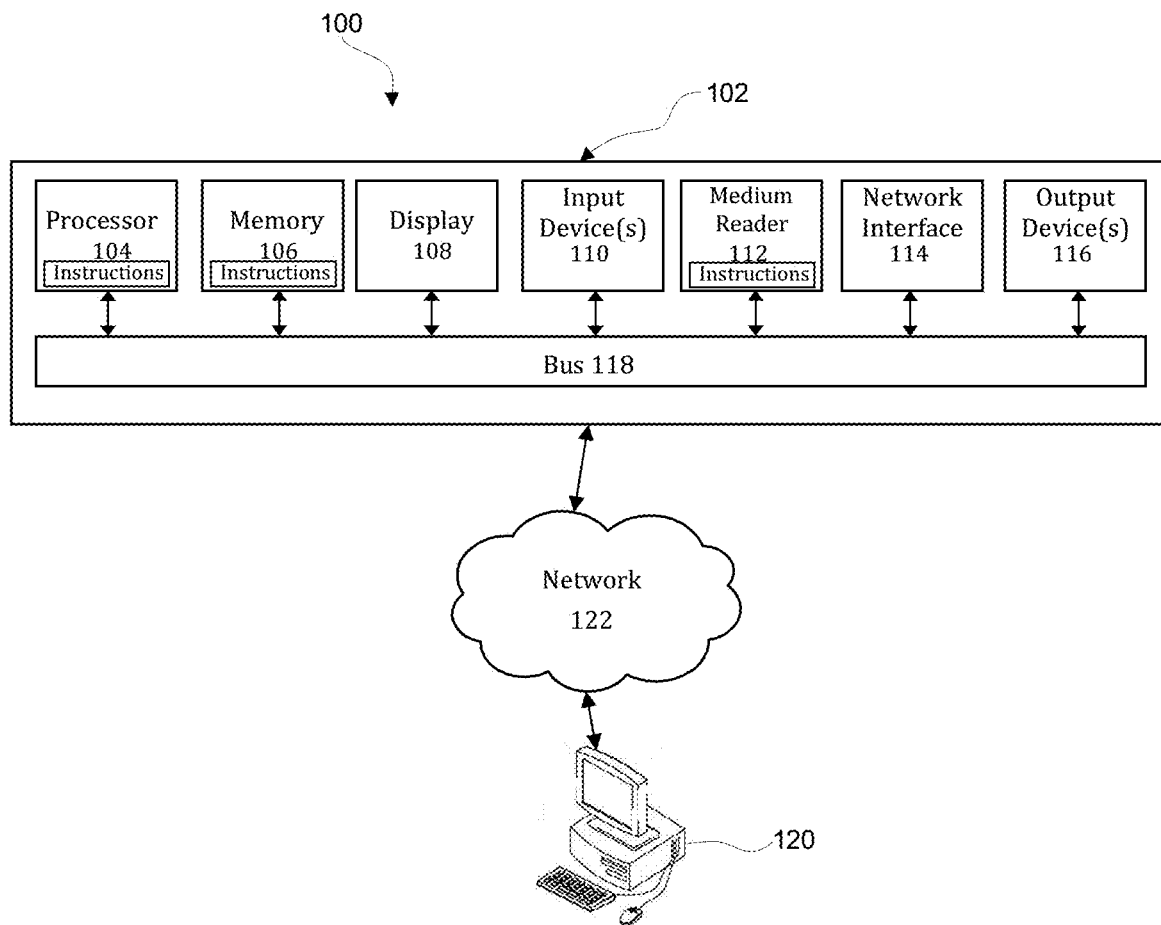
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automating a process of generating messages that are responsive to client inquiries by using an AI algorithm that implements a machine learning technique to ensure accuracy and timeliness in the responses.

Figure 2:
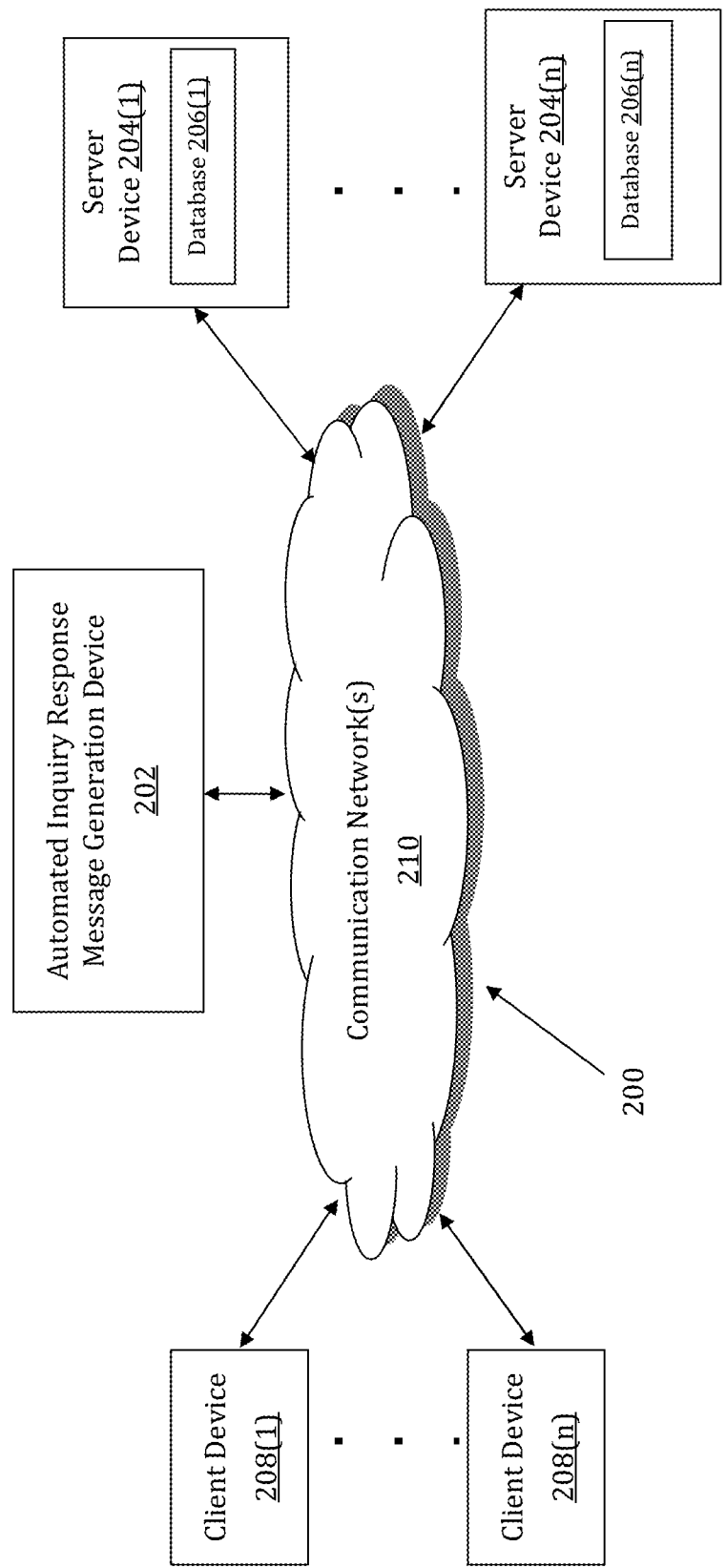
FIG. 2 illustrates an exemplary diagram of a network environment.

Referring to FIG. 2, a schematic of an exemplary network environment 200 for implementing a method for automating a process of generating messages that are responsive to client inquiries by using an AI algorithm that implements a machine learning technique to ensure accuracy and timeliness in the responses is illustrated. In an exemplary embodiment, the method is executable on any networked computer platform, such as, for example, a personal computer (PC).

The method for automating a process of generating messages that are responsive to client inquiries by using an AI algorithm that implements a machine learning technique to ensure accuracy and timeliness in the responses may be implemented by an Automated Inquiry Response Message Generation (AIRMG) device 202. The AIRMG device 202 may be the same or similar to the computer system 102 as described with respect to FIG. 1. The AIRMG device 202 may store one or more applications that can include executable instructions that, when executed by the AIRMG device 202, cause the AIRMG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AIRMG device 202 itself, may be located in virtual server(s) running in a cloud-based computing environment rather than being tied to one or more specific physical network computing devices. Also, the application(s) may be running in one or more virtual machines (VMs) executing on the AIRMG device 202. Additionally, in one or more embodiments of this technology, virtual machine(s) running on the AIRMG device 202 may be managed or supervised by a hypervisor.

In the network environment 200 of FIG. 2, the AIRMG device 202 is coupled to a plurality of server devices 204(1)-204(n) that hosts a plurality of databases 206(1)-206(n), and also to a plurality of client devices 208(1)-208(n) via communication network(s) 210. A communication interface of the AIRMG device 202, such as the network interface 114 of the computer system 102 of FIG. 1, operatively couples and communicates between the AIRMG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AIRMG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AIRMG devices that efficiently implement a method for automating a process of generating messages that are responsive to client inquiries by using an AI algorithm that implements a machine learning technique to ensure accuracy and timeliness in the responses.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AIRMG device 202 may be a standalone device or integrated with one or more other devices or apparatuses, such as one or more of the server devices 204(1)-204(n), for example. In one particular example, the AIRMG device 202 may include or be hosted by one of the server devices 204(1)-204(n), and other arrangements are also possible. Moreover, one or more of the devices of the AIRMG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AIRMG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to historical client inquiries and responses and account-specific data that relates to client accounts.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AIRMG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AIRMG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AIRMG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AIRMG device 202, the server devices 204(1)-204(n), or the client devices 208(1)-208(n), for example, may be configured to operate as virtual instances on the same physical machine. In other words, one or more of the AIRMG device 202, the server devices 204(1)-204(n), or the client devices 208(1)-208(n) may operate on the same physical device rather than as separate devices communicating through communication network(s) 210. Additionally, there may be more or fewer AIRMG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
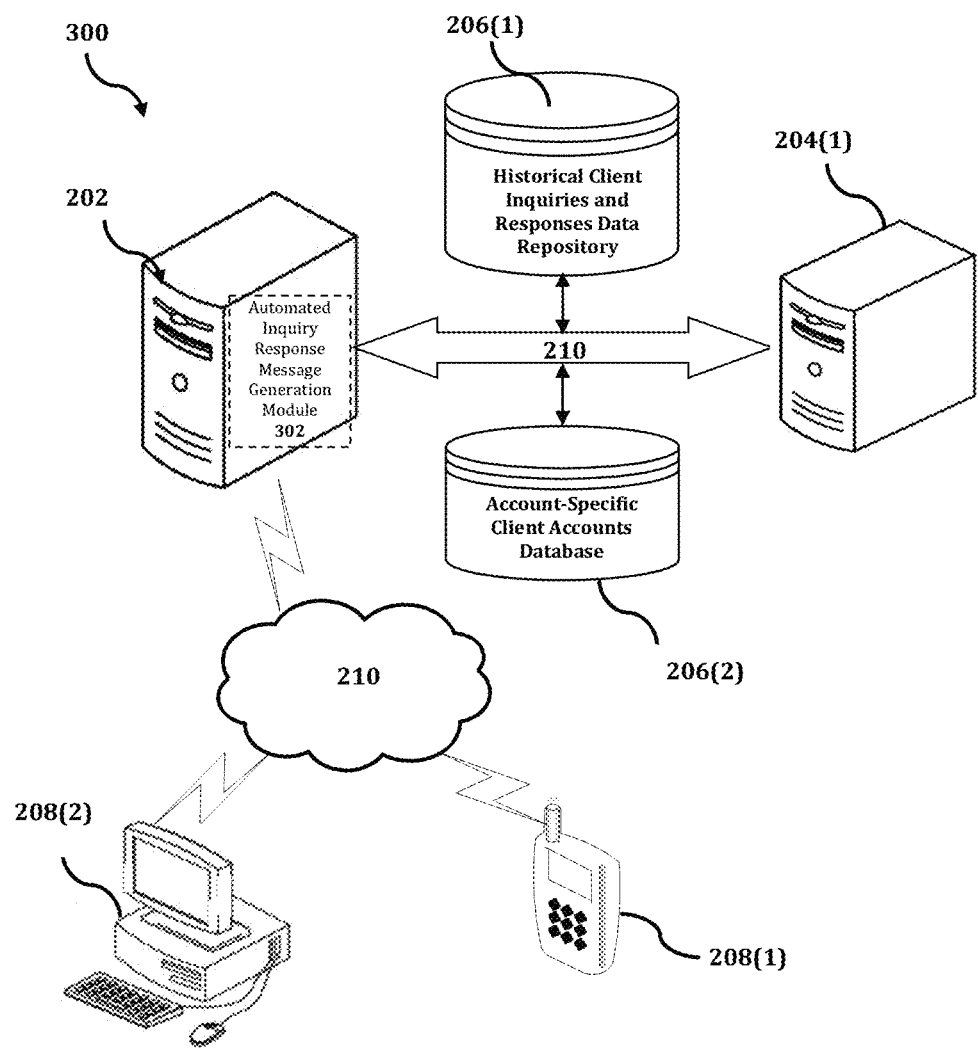
FIG. 3 shows an exemplary system for implementing a method for automating a process of generating messages that are responsive to client inquiries by using an AI algorithm that implements a machine learning technique to ensure accuracy and timeliness in the responses.

The AIRMG device 202 is described and illustrated in FIG. 3 as including an automated inquiry response message generation module 302, although it may include other rules, policies, modules, databases, or applications, for example. As will be described below, the automated inquiry response message generation module 302 is configured to implement a method for automating a process of generating messages that are responsive to client inquiries by using an AI algorithm that implements a machine learning technique to ensure accuracy and timeliness in the responses.

An exemplary process 300 for implementing a mechanism for automating a process of generating messages that are responsive to client inquiries by using an AI algorithm that implements a machine learning technique to ensure accuracy and timeliness in the responses by utilizing the network environment of FIG. 2 is illustrated as being executed in FIG. 3. Specifically, a first client device 208(1) and a second client device 208(2) are illustrated as being in communication with AIRMG device 202. In this regard, the first client device 208(1) and the second client device 208(2) may be "clients" of the AIRMG device 202 and are described herein as such. Nevertheless, it is to be known and understood that the first client device 208(1) and/or the second client device 208(2) need not necessarily be "clients" of the AIRMG device 202, or any entity described in association therewith herein. Any additional or alternative relationship may exist between either or both of the first client device 208(1) and the second client device 208(2) and the AIRMG device 202, or no relationship may exist.

Further, AIRMG device 202 is illustrated as being able to access a historical client inquiries and responses data repository 206(1) and an account-specific client accounts database 206(2). The automated inquiry response message generation module 302 may be configured to access these databases for implementing a method for automating a process of generating messages that are responsive to client inquiries by using an AI algorithm that implements a machine learning technique to ensure accuracy and timeliness in the responses.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AIRMG device 202 via broadband or cellular communication. Of course, these embodiments are merely exemplary and are not limiting or exhaustive.

Upon being started, the automated inquiry response message generation module 302 executes a process for automating a process of generating messages that are responsive to client inquiries by using an AI algorithm that implements a machine learning technique to ensure accuracy and timeliness in the responses. An exemplary process for automating a process of generating messages that are responsive to client inquiries by using an AI algorithm that implements a machine learning technique to ensure accuracy and timeliness in the responses is generally indicated at flowchart 400 in FIG. 4.

Figure 4:
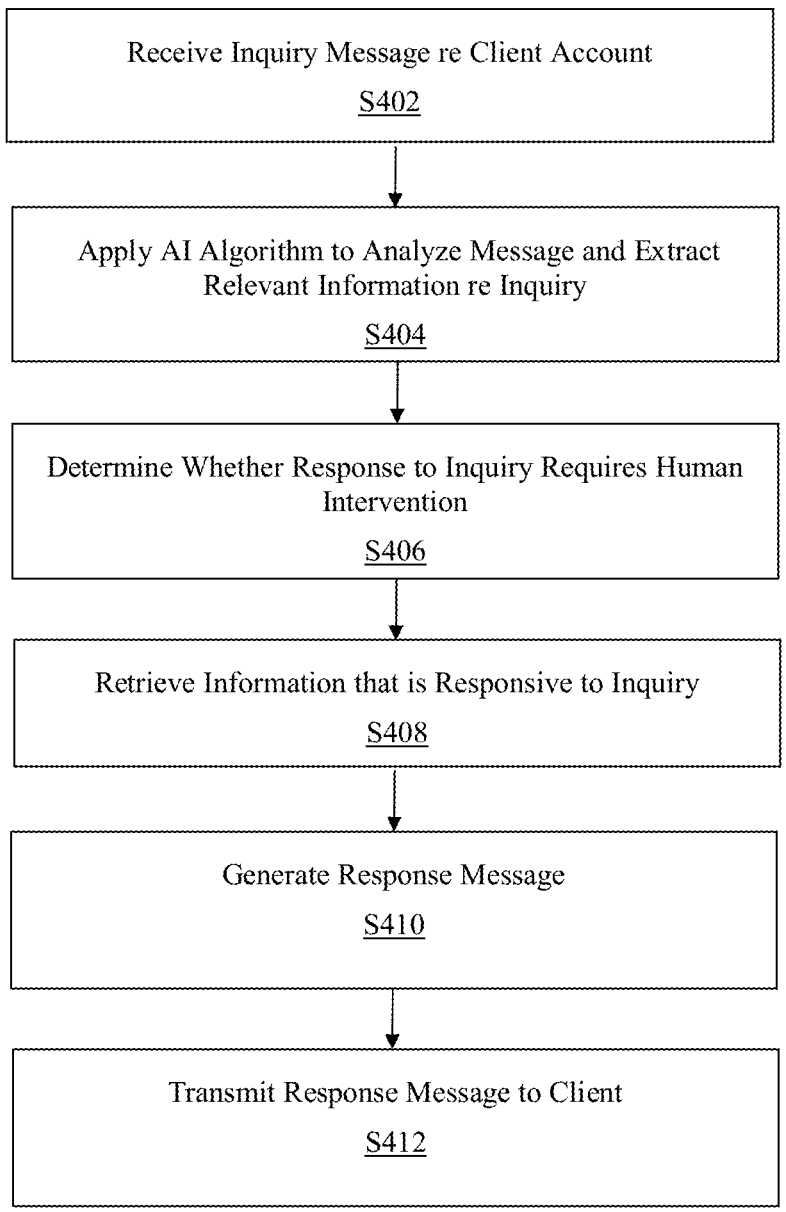
FIG. 4 is a flowchart of an exemplary process for implementing a method for automating a process of generating messages that are responsive to client inquiries by using an AI algorithm that implements a machine learning technique to ensure accuracy and timeliness in the responses.

In process 400 of FIG. 4, at step S402, the automated inquiry response message generation module 302 receives a first message from a user, such as, for example, a client. The first message includes an inquiry that relates to an account associated with the user. In an exemplary embodiment, the first message may include any one or more of an email message, a text message, also known as a Short Message Service (SMS) message, a voice message, and/or a chat message.

At step S404, the automated inquiry response message generation module 302 analyzes the first message in order to extract information that relates to the inquiry. In an exemplary embodiment, the analysis is performed by applying a first AI algorithm that is trained by using historical messages to the first message. The analyzing operation may include assigning the first message to either a first grouping that includes unstructured text messages and a second grouping that includes structured tables. As a result of the analysis, any one or more of the following may be extracted from the first message: an action required by the inquiry; an instrument that relates to the inquiry, such as, for example, a financial instrument; a status that relates to the inquiry; and/or a problem that relates to the inquiry.

In an exemplary embodiment, the analyzing operation may include the following steps: First, using a pre-trained vector to identify at least one entity that is included in the first message. Second, filtering each identified entity by using a pre-trained stoplist. Third, labeling each such filtered entity by using a predetermined set of entity types. In an exemplary embodiment, the predetermined set of entity types may include any one or more of a client reference identification (i.e., client reference ID); a financial institution reference identification (i.e., bank reference ID); a date; a currency amount; a volume (e.g., a number of shares of stock within a particular transaction); a Committee on Uniform Securities Identification Procedures (CUSIP) code; a Stock Exchange Daily Official List (SEDOL) code; an International Securities Identification Number (ISIN) code; and an "other" entity type. In an exemplary embodiment, the "other" entity type is used as a catch-all miscellaneous category for any entity that does not belong to any of the other listed entity types.

At step S406, the automated inquiry response message generation module 302 determines whether generating a response to the inquiry requires human intervention. In an exemplary embodiment, the determination may be made by performing the following steps: First, using a pre-trained k-means clustering model to perform a text-based clustering operation on at least one sentence included in the first message. Second, comparing a result of the clustering operation with a predetermined set of inquiry types in order to make the determination as to whether or not human intervention is required. In an exemplary embodiment, the clustering operation may include: performing a Parts of Speech (POS) token tagging operation with respect to each word included in each respective sentence; and converting each respective sentence into a vector of numbers by using a Term Frequency-Inverse Document Frequency (TF-IDF) vectorizer.

At step S408, when a determination is made that human intervention is not required, the automated inquiry response message generation module 302 retrieves information that is responsive to the inquiry from a memory, such as, for example, account-specific client accounts database 206(2). In an exemplary embodiment, when a determination is made that human intervention is required, a notification to this effect may be made, and the automatic response message generation is terminated.

At step S410, the automated inquiry response message generation module 302 uses the information that is responsive to the inquiry that was retrieved in step S408 to generate a second message. Then, at step S412, the automated inquiry response message generation module 302 transmits the second message to the user from whom the inquiry was received in step S402.

In an exemplary embodiment, an Artificial Intelligence Messaging Service (AIMS) requires minimal manual labeling of data, and instead learns from historical emails. This reduces the manual effort needed to implement the solution. Email messages that are in-scope for AIMS are emails that are: 1) originated by an external client or internally by an internal sender; 2) trade related, transaction status queries; 3) email messages managed on a known email messaging platform; and 4) single chain emails, i.e., emails that have not been replied to by another party. Re multi-chain emails, i.e., emails that have been replied to by another party, AIMS is also able to handle the most recent email in the chain.

In an exemplary embodiment, in-scope emails go through a two step AIMS process: 1) Entity Extraction, by which AIMS tries to extract reference identification numbers, such as a bank reference ID and/or a client reference ID, from a query email. If the extraction is successful, then the query email is passed to a Query Filtering component. Further, re multi-chain emails, when an email is the first email received by AIMS but also includes a previous conversation between other parties, AIMS performs an entity extraction from all of the emails in that chain. In addition, if the most recent incoming email does not contain entities, the AIMS entity extractor looks back into the email chain until entities are found or the end of the email chain is reached, and attempts to perform entity extraction until entities are found. 2) Query Filtering, by which AIMS classifies whether or not the query email is in-scope.

In an exemplary embodiment, an input to AIMS is a query email from a client, and an output of AIMS is a template response email which is reviewed by a user. The template email is created by using a rigid template which contains a generic salutation, a table with six set columns, and a basic sign-off.

In an exemplary embodiment, the automatically-generated template response includes a table that has six columns. The table column headers may include Bank Reference ID, Client Reference ID, Market, Value Date, Status, and Comments. In an exemplary embodiment, the bank reference ID and/or client reference ID is extracted by AIMS from the query email, and then, by using the extracted information, information for the remaining fields may be retrieved from a database.

In an exemplary embodiment, a performance of the model may be assessed on an end-to-end basis by using a coverage metric, a usage rate metric, and an extraction metric.

Coverage Metric: In an exemplary embodiment, AIMS reduces the number of emails that needs to be manually created by generating auto-populated template email responses, which may be reviewed before being sent out to a client, thereby alleviating a burden on resources. The coverage metric may be computed as the number of templated email response generated by AIMS as a percentage of total emails received across all shared mailboxes (SMBs):

$$\text{Coverage} = \frac{\text{Number of templated responses generated by } AIMS}{\text{Total emails received across all } SMBs}$$

In an exemplary embodiment, the model may be considered successful if the coverage is greater than or equal to a predetermined percentage value, such as, for example, 5%.

Usage Rate Metric: In an exemplary embodiment, this metric tracks a usage rate. If a templated response email generated by AIMS is not used to respond to clients by a user, it will be considered as incorrect template generation by AIMS.

$$\text{Usage Rate} = \frac{\text{Number of } AIMS \text{ generated response utilized by User}}{\text{Number of templated response generated by } AIMS}$$

In the above expression, "Number of AIMS generated response utilized by User" refers to a count of the templated responses from AIMS utilized by user to send a final response to client. In an exemplary embodiment, the model may be considered successful if the usage rate is greater than or equal to a predetermined percentage value, such as, for example, 70%.

Extraction Metrics: In an exemplary embodiment, by using the coverage metric, it is possible to ensure that the model generates sufficient templated responses for a business to consider it as useful. In addition, by using the usage rate metric, it is possible to ensure that a sufficient number of the model-generated templated response templates are actually used by the user. In an exemplary embodiment, with extraction metrics, an objective is to ensure that in the templated responses generated by the model and utilized by the user, the model is able to capture enough and accurate relevant entities for it to be considered useful.

In an exemplary embodiment, the term "relevant entities" refers to internal and/or external reference IDs. The model is only responsible for extracting these reference IDs, and the data for the remaining fields are queried from a databased by using the extracted reference IDs. Hence, in an exemplary embodiment, the extraction metrics are solely used for evaluating the model on the reference IDs which it extracts.

In an exemplary embodiment, the extraction metrics are computed by comparing the entities present in the templated response by model and the final response sent to client by user for that email:

$$\text{Extraction Recall} = \frac{\sum_i^T n(N_1^i \cap N_2^i)}{\sum_i^T n(N_2^i)}$$

$$\text{Extraction Precision} = \frac{\sum_i^T n(N_1^i \cap N_2^i)}{\sum_i^T n(N_1^i)}$$

where $N_1^i$ is the set of bank reference IDs present in $i^{th}$ templated response generated by AIMS; $N_2^i$ is the set of bank reference IDs present in final response sent to clients by user using the $i^{th}$ templated response generated by AIMS; T is the total number of AIMS generated responses used by users to send a final response; and n is a function mapping a set to its size e.g., n(A)—size of set A. In an exemplary embodiment, the model may be considered successful if each of the extraction recall metric and the extraction precision metric is greater than or equal to a predetermined percentage value, such as, for example, 60%.

Methodology: In an exemplary embodiment, the methodology includes several steps, as follows: Step 1: Receive client email. In an exemplary embodiment, incoming emails are received by AIMS. Step 2: AIMS Entity Extraction. In an exemplary embodiment, AIMS extract relevant entities, i.e., external or internal reference IDs, from the text and tables in the emails.

In an exemplary embodiment, the AIMS model is trained by using a sample of at least 1,000 historical emails. AIMS uses textual inferences such as word embedding, i.e., vector representation of the words, and regex to identify patterns which indicate the existence of a reference within the email. AIMS then uses these learned patterns of textual inferences from the database of entities to extract relevant entity candidates from the text and tables in the emails. This is accomplished by identifying potential entities and referencing these against the learned library of entities, which is built from the textual inferences.

In an exemplary embodiment, AIMS separates data in incoming emails into unstructured text and structured tables. For unstructured text, AIMS uses pretrained word embeddings to identify candidate entities. Unknown words, i.e., words without a pretrained vector, are treated as potential entities and passed through a series of libraries and regexes to assign an entity type. In particular, in an exemplary embodiment, the stdnum library is used to identify CUSIPs, SEDOLs, and ISINs, and a dateparser library is used to identify dates. Remaining candidate terms are either positively identified using regexes or eliminated by using stoplists, such as, for example, country names, known greeting words and/or signatures, and/or frequent terms based on dataset statistics.

Unstructured text extraction: Step 1: Parse email and identify all candidate entities by using pretrained word vectors, and then filter candidates by using a learned stoplist. Step 2: Label entities with known entity types by using an ensemble of entity models. In an exemplary embodiment, the known entity types may include any one or more of a client reference identification (i.e., client reference ID); a financial institution reference identification (i.e., bank reference ID); a date; a currency amount; a volume (e.g., a number of shares of stock within a particular transaction); a Committee on Uniform Securities Identification Procedures (CUSIP) code; a Stock Exchange Daily Official List (SEDOL) code; an International Securities Identification Number (ISIN) code; and an "other" entity type. Step 3: Return in-scope entities and "other" entity types for enhanced recall.

In an exemplary embodiment, for tables, AIMS separates the table header from the body and matches header types to known entity types, and then cascades the label to all entities in the same column. For tables without headers, each column is processed in the same way as unstructured text, with the entity type assigned to the entire column by popular vote.

For both text and tables, three types of entity types are returned: bank reference ID, client reference ID, and Other. "Other" terms are entities which may not be positively identified or eliminated during labeling. These entities may be treated as potential client reference IDs in order to maintain high recall. If AIMS is unable to identify an entity, then the email may be treated as being out-of-scope and then routed for manual review. and are processed as per today's existing practice.

Email message with a table: Step 1: Parse the email and identify each table and its column headers and values. Step 2: Label entities with known entity types using table headers and ensemble of entity models. Step 3: Return in-scope entities and "other" entity types for enhanced recall.

Query Filtering: In an exemplary embodiment, AIMS uses a query pre-filtering operation and a clustering operation to determine whether the response can be handled by AIMS, i.e., whether to continue to generate a template response or to divert this to a manual review process.

Query Pre-Filtering: Based on the presence of candidate keyword combinations, this check allows the model to distinguish between worded queries that are similar in meaning to in-scope emails. By obtaining ordered set of values, i.e., tuples, of keywords that model the action required, financial instrument in question, status they are querying for and any problem they might be mentioning, the model is able to determine whether a query is to be considered for response generation. For example:

| Action + Instrument + Status + Problem: | | | | |
|---|---|---|---|---|
| Email query | Action required | Instrument | Status | Problem |
| Please advise whether the trade has settled? | Advise | trade | settled | |
| Have the following returns settled? | Have | returns | settled | |
| The below loans are failing, please confirm | confirm | loans | | failing |

| Problem + Instrument: | | |
|---|---|---|
| Email query | Instrument | Problem |
| This trade is failing | trade | failing |
| This return is pending | returns | pending |

As shown in the above examples, collections of candidate keywords may be generated automatically from a list of actions, states, instruments, and problems. A check may be performed for the presence of any one collection, in which case it is considered a pass.

In an exemplary embodiment, the following is a list of candidate keywords to be considered:

| Actions | Instruments | Status | Problems |
|---|---|---|---|
| 'advise' | 'return' | 'settl' | 'pende' |
| 'provide' | 'loan' | 'status' | 'fail' |
| 'know' | 'sale' | 'update' | |
| 'update' | 'trade' | 'show' | |
| 'give' | | | |
| 'show' | | | |
| 'confirm' | | | |
| 'see' | | | |
| 'tell' | | | |
| 'has' | | | |
| 'did' | | | |

Clustering: In an exemplary embodiment, AIMS uses a pre-trained k-means clustering model to identify relevant transaction related emails. Once a new email falls into these marked clusters, it is identified as being an email that AIMS can handle. All other emails may be treated as being out-of-scope and thus routed for manual review.

In order to cluster the incoming queries, the model needs to convert the text into a vector of numbers or an embedding. To do this, in an exemplary embodiment, the model makes use of the Parts of Speech (POS) Tagged tokens as well as the inter-word dependency using a dependency parser. There is a specific focus on verbs, adverbs and nouns, as these are highly indicative of the actions that are required to be performed.

In addition, once a sentence has been split using the above methods, it is passed through a Term Frequency-Inverse Document Frequency vectorizer to convert it into a vector of numbers. This helps in identifying frequently occurring words across the dataset that add no value, and provides a relatively higher weight to the important words for that document.

In an exemplary embodiment, when an email message has at least one sentence indicating a simple action, AIMS can handle this. Each such sentence is vectorized by using words that indicate action and objects, and the words are clustered to understand different types. An identification as to whether a sentence cluster is in-scope or out-of-scope includes a determination that out-of-office sentences are out-of-scope; sentences requiring a physical next-step action, such as updating a system, are also out-of-scope; and sentences requiring a status update are determined as being in-scope.

In an exemplary embodiment, a final in-scope versus out-of-scope decision is a disjunction (i.e., an OR) of the prefilter result and the clustering result. Thus, it is possible to increase the recall of the query filtering module, and certain queries may be considered even if the model has not seen them previously.

When a determination is made that the email inquiry is in-scope, a database retrieval is performed with respect to each of the following data fields: Bank Reference ID, Client Reference ID, Market, Value Date, Status and Comments for each extracted entity.

A templated email response is then populated with the retrieved information in order to generate a draft email that is responsive to the client inquiry. In an exemplary embodiment, a human user reviews the email before sending to the client.

In an exemplary embodiment, the final output is a populated email template that is ready for user review. The draft email may contain the following fields: 1) generic salutation;

2) bank reference; 3) client reference; 4) market; 5) value date; 6) status; and 7) comments.

In an exemplary embodiment, when the database/system of records response has been received, AIMS may dynamically adapt the template based on the database response. For example, if a table output from our database that contains an empty column is received, AIMS may remove this column; if a table output from the system of records with a single row is received, AIMS may map the characteristics of this row to plain text; and if a table with rows all having similar entries is received, AIMS may summarize the table information in plain text. In an exemplary embodiment, AIMS performs the dynamic adaptation of the template based on a predetermined set of rules and/or by leveraging a large language model (LLM) that is trained to perform such a dynamic adaptation.

In an exemplary embodiment, AIMS is capable of automatically learning static templates for new use cases, without a need for human intervention to create such templates. This may be performed by using sample responses that have previously been generated for specific use cases as in-context learning examples for training an LLM and then prompting the LLM to generate a static template for a new use case. To generate the static template, the LLM would use a wording that is inspired by one that has actually been used in practice.

In an exemplary embodiment, the LLM may also be used to dynamically generate responses using the output returned by the system of records/database.

Figure 5:
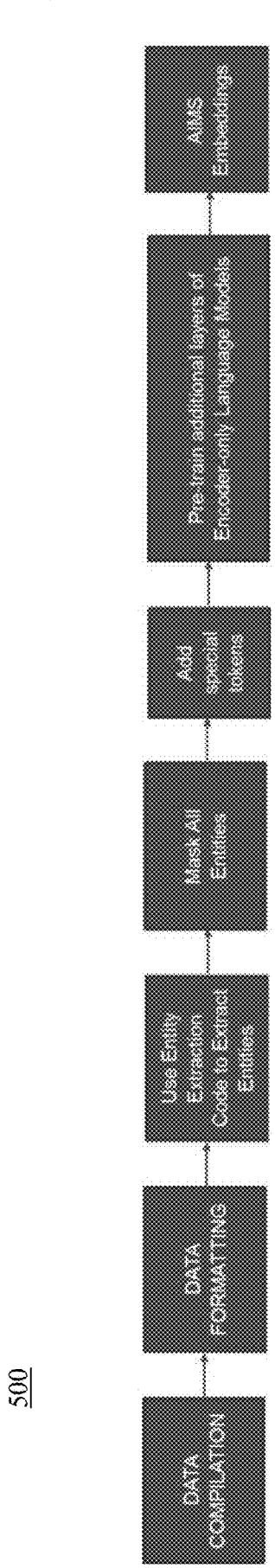
FIG. 5 is an architecture diagram that illustrates various operations that are executed in a method for automating a process of generating messages that are responsive to client inquiries by using an AI algorithm that implements a machine learning technique to ensure accuracy and timeliness in the responses, according to an exemplary embodiment.

FIG. 5 is an architecture diagram 500 that illustrates a pretraining model to be used in connection with an execution of a method for automating a process of generating messages that are responsive to client inquiries by using an AI algorithm that implements a machine learning technique to ensure accuracy and timeliness in the responses, according to an exemplary embodiment.

In an exemplary embodiment, a further objective is to enhance a language understanding ability of AIMS by pretraining a language model on historical conversations. This feature enables a query filter and entity extractor to become more context-aware, hence improving their accuracy. More specifically, instead of solely relying on candidate keyword combinations, the query filter is then able to comprehend the full context of a conversation, hence providing context-aware suggestions on whether or not AIMS should attempt to generate a response. Similarly, the entity extractor is then able to combine context-aware and pattern-based approaches, resulting in a more accurate ensemble-based entity extractor that reduces both false positives and false negatives.

To pretrain the language model, a bulk of conversational data is gathered from various use-cases and several preprocessing steps are performed. This includes compiling the data in the same format, chunking the data based on the maximum number of tokens allowed for the language model, and parsing the conversations. The pattern-based entity extractor is then utilized to identify entities, which are then masked using special tokens. The data is then ready to be used to continue the pretraining of conventional pre-trained encoder-only language models. In order to leverage pre-trained weights of conventional pre-trained language models, all of the layers of these models are frozen and then additional layers are added, and these additional layers are trained using the pre-processed historical data. This results in context-aware embeddings for AIMS, which are then used for downstream tasks, including query filtering and entity extraction. Referring to FIG. 5, the architecture 500 of the pretraining language model includes a data compilation component, a data formatting component, an entity extraction component that uses an entity extraction code, a masking component that masks all entities, a special token addition component, a pre-training of additional layers of encoder-only language models component, and an AIMS embeddings component.

Accordingly, with this technology, a process for automating a process of generating messages that are responsive to client inquiries by using an AI algorithm that implements a machine learning technique to ensure accuracy and timeliness in the responses is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for automatically generating messages that are responsive to inquiries, the method being implemented by at least one processor, the method comprising:

receiving, by the at least one processor from a user, a first message that includes an inquiry that relates to an account associated with the user;

analyzing, by the at least one processor, the first message in order to extract information that relates to the inquiry;

determining, by the at least one processor based on a result of the analyzing, whether generating a response to the inquiry requires human intervention;

when a determination is made that the human intervention is not required, retrieving, by the at least one processor from a memory, information that is responsive to the inquiry;

generating, by the at least one processor, a second message that includes the retrieved information that is responsive to the inquiry; and transmitting, by the at least one processor to the user, the second message, wherein the analyzing comprises:
identifying at least one entity that is included in the first message by using a pre-trained vector;
filtering each of the identified at least one entity by using a pre-trained stoplist; and
labeling each of the filtered at least one entity by using a predetermined set of entity types, and wherein the pre-trained stoplist includes country names, predetermined greeting words, predetermined signatures, and terms determined as being frequent based on dataset statistics, and wherein the method further comprises computing each of a coverage metric that relates to a ratio between a number of generated messages and a total number of emails received across a predetermined set of mailboxes, a usage rate metric that relates to a percentage of the number of generated messages that are used by the user, and an extraction metric that relates to a correctness of at least one reference identification included in the extracted information that relates to the inquiry.

2. The method of claim 1, wherein the analyzing further comprises applying, to the first message, a first artificial intelligence (AI) algorithm that is trained by using historical messages.

3. The method of claim 2, wherein the analyzing further comprises assigning the first message to one from among a first subset that includes unstructured text and a second subset that includes structured tables.

4. The method of claim 1, wherein when the inquiry relates to a financial transaction, the predetermined set of entity types includes a client reference identification, a financial institution reference identification, a date, a currency amount, a volume, a Committee on Uniform Securities Identification Procedures (CUSIP) code, a Stock Exchange Daily Official List (SEDOL) code, an International Securities Identification Number (ISIN) code, and an other entity type.

5. The method of claim 1, wherein the analyzing further comprises extracting at least one from among an action required by the inquiry, an instrument that relates to the inquiry, a status that relates to the inquiry, and a problem that relates to the inquiry.

6. The method of claim 5, wherein the determining of whether the human intervention is required comprises:
using a pre-trained k-means clustering model to perform a text-based clustering operation on at least one sentence included in the first message; and comparing a result of the clustering operation with a predetermined set of inquiry types in order to determine whether the human intervention is required.

7. The method of claim 6, wherein the clustering operation includes:
performing a Parts of Speech (POS) token tagging operation with respect to each word included in the at least one sentence; and
converting the at least one sentence into a vector of numbers by using a Term Frequency-Inverse Document Frequency (TF-IDF) vectorizer,
wherein the POS token tagging operation includes labeling at least a first word as being a noun, labeling at least a second word as being a verb, and labeling at least a third word as being an adverb.

8. The method of claim 1, wherein the first message includes at least one from among an email message, a text message, a voice message, and a chat message.

9. A computing apparatus for automatically generating messages that are responsive to inquiries, the computing apparatus comprising:
a processor;
a memory; and
a communication interface coupled to each of the processor and the memory,
wherein the processor is configured to:
receive, via the communication interface from a user, a first message that includes an inquiry that relates to an account associated with the user;
analyze, the first message in order to extract information that relates to the inquiry;
determine, based on a result of the analysis, whether generating a response to the inquiry requires human intervention;
when a determination is made that the human intervention is not required, retrieve, from the memory, information that is responsive to the inquiry;
generate a second message that includes the retrieved information that is responsive to the inquiry; and
transmit, to the user via the communication interface, the second message,
wherein the processor is further configured to perform the analysis by:
identifying at least one entity that is included in the first message by using a pre-trained vector;
filtering each of the identified at least one entity by using a pre-trained stoplist; and
labeling each of the filtered at least one entity by using a predetermined set of entity types, and
wherein the pre-trained stoplist includes country names, predetermined greeting words, predetermined signatures, and terms determined as being frequent based on dataset statistics, and
wherein the processor is further configured to compute each of a coverage metric that relates to a ratio between a number of generated messages and a total number of emails received across a predetermined set of mailboxes, a usage rate metric that relates to a percentage of the number of generated messages that are used by the user, and an extraction metric that relates to a correctness of at least one reference identification included in the extracted information that relates to the inquiry.

10. The computing apparatus of claim 9, wherein the processor is further configured to perform the analysis by applying, to the first message, a first artificial intelligence (AI) algorithm that is trained by using historical messages.

11. The computing apparatus of claim 10, wherein the processor is further configured to assign the first message to one from among a first subset that includes unstructured text and a second subset that includes structured tables.

12. The computing apparatus of claim 9, wherein when the inquiry relates to a financial transaction, the predetermined set of entity types includes a client reference identification, a financial institution reference identification, a date, a currency amount, a volume, a Committee on Uniform Securities Identification Procedures (CUSIP) code, a Stock Exchange Daily Official List (SEDOL) code, an International Securities Identification Number (ISIN) code, and an other entity type.

13. The computing apparatus of claim 9, wherein the processor is further configured to extract at least one from among an action required by the inquiry, an instrument that relates to the inquiry, a status that relates to the inquiry, and a problem that relates to the inquiry.

14. The computing apparatus of claim 13, wherein the processor is further configured to determine whether the human intervention is required by:
using a pre-trained k-means clustering model to perform a text-based clustering operation on at least one sentence included in the first message; and
comparing a result of the clustering operation with a predetermined set of inquiry types in order to determine whether the human intervention is required.

15. The computing apparatus of claim 14, wherein the clustering operation includes:
performing a Parts of Speech (POS) token tagging operation with respect to each word included in the at least one sentence; and
converting the at least one sentence into a vector of numbers by using a Term Frequency-Inverse Document Frequency (TF-IDF) vectorizer,
wherein the POS token tagging operation includes labeling at least a first word as being a noun, labeling at least a second word as being a verb, and labeling at least a third word as being an adverb.

16. The computing apparatus of claim 9, wherein the first message includes at least one from among an email message, a text message, a voice message, and a chat message.

17. A non-transitory computer readable storage medium storing instructions for automatically generating messages that are responsive to inquiries, the storage medium comprising executable code which, when executed by a processor, causes the processor to:
receive, from a user, a first message that includes an inquiry that relates to an account associated with the user;
analyze the first message in order to extract information that relates to the inquiry;
determine, based on a result of the analysis, whether generating a response to the inquiry requires human intervention;
when a determination is made that the human intervention is not required, retrieve, from a memory, information that is responsive to the inquiry;
generate a second message that includes the retrieved information that is responsive to the inquiry; and
transmit the second message to the user,
wherein when executed by the processor, the executable code further causes the processor to perform the analysis by:
identifying at least one entity that is included in the first message by using a pre-trained vector;

filtering each of the identified at least one entity by using a pre-trained stoplist; and labeling each of the filtered at least one entity by using a predetermined set of entity types, and wherein the pre-trained stoplist includes country names, predetermined greeting words, predetermined signatures, and terms determined as being frequent based on dataset statistics, and wherein when executed by the processor, the executable code further causes the processor to compute each of a coverage metric that relates to a ratio between a number of generated messages and a total number of emails received across a predetermined set of mailboxes, a usage rate metric that relates to a percentage of the number of generated messages that are used by the user, and an extraction metric that relates to a correctness of at least one reference identification included in the extracted information that relates to the inquiry.

18. The storage medium of claim 17, wherein when executed by the processor, the executable code further causes the processor to apply, to the first message, a first artificial intelligence (AI) algorithm that is trained by using historical messages.

\* \* \* \* \*